United States Patent
Iino et al.

(10) Patent No.: US 8,252,483 B2
(45) Date of Patent: *Aug. 28, 2012

(54) FUEL CELL SEPARATOR HAVING A CORRUGATED ELECTRICALLY CONDUCTING FLOW PATH

(75) Inventors: Tadashi Iino, Kawasaki (JP); Zenichiro Izumi, Kawasaki (JP); Yukihito Tanaka, Wako (JP); Toshiki Kawamura, Wako (JP)

(73) Assignees: Showa Denko K.K., Tokyo (JP); Honda Motor Co., Ltd., Tokyo (JP)

( * ) Notice: Subject to any disclaimer, the term of this patent is extended or adjusted under 35 U.S.C. 154(b) by 599 days.

This patent is subject to a terminal disclaimer.

(21) Appl. No.: 12/442,700

(22) PCT Filed: Sep. 27, 2007

(86) PCT No.: PCT/JP2007/069419
§ 371 (c)(1),
(2), (4) Date: Mar. 24, 2009

(87) PCT Pub. No.: WO2008/038835
PCT Pub. Date: Apr. 3, 2008

(65) Prior Publication Data
US 2009/0243147 A1    Oct. 1, 2009

(30) Foreign Application Priority Data

Sep. 29, 2006  (JP) .................... 2006-268454

(51) Int. Cl.
*H01M 4/64* (2006.01)

(52) U.S. Cl. ......... 429/519; 429/520; 429/521; 429/514
(58) Field of Classification Search .............. 429/521, 429/520, 519, 518, 517, 514, 513; 252/502, 252/510, 511; 264/105
See application file for complete search history.

(56) References Cited

U.S. PATENT DOCUMENTS

| | | | |
|---|---|---|---|
| 6,468,685 B1 | 10/2002 | Yoshida | |
| 2002/0182473 A1 | 12/2002 | Blunk et al. | |
| 2004/0023095 A1* | 2/2004 | Middelman et al. | 429/34 |
| 2004/0197633 A1 | 10/2004 | Yamamoto et al. | |
| 2005/0244700 A1 | 11/2005 | Abd Elhamid et al. | |
| 2006/0027790 A1 | 2/2006 | Arai et al. | |
| 2011/0143022 A1* | 6/2011 | Jang et al. | 427/115 |

FOREIGN PATENT DOCUMENTS

EP    1094045    4/2001

(Continued)

OTHER PUBLICATIONS

Korean Office Action for corresponding KR Application No. 10-2009-7003596, Oct. 19, 2010.

(Continued)

*Primary Examiner* — Raymond Alejandro
(74) *Attorney, Agent, or Firm* — Ditthavong Mori & Steiner, P.C.

(57) ABSTRACT

A lightweight, compact high-performance fuel cell separator is provided with enhanced output density and capable of being stacked without a gas seal member. Embodiments include a separator having a corrugated electrically conducting flow path. A recess and projection are formed on front and rear surfaces, each constituting a gas flow path alternately arrayed abreast in a plane.

13 Claims, 11 Drawing Sheets

FOREIGN PATENT DOCUMENTS

| | | |
|---|---|---|
| EP | 1315223 | 5/2003 |
| EP | 1324411 | 7/2003 |
| JP | 60-161144 | 8/1985 |
| JP | 03-105863 | 5/1991 |
| JP | 08-222241 | 8/1996 |
| JP | 2001-052721 | 2/2001 |
| JP | 2001-068128 | 3/2001 |
| JP | 2001-196076 | 7/2001 |
| JP | 2001-216977 | 8/2001 |
| JP | 2002-008685 | 1/2002 |
| JP | 2003-22816 | 1/2003 |
| JP | 2003-282084 | 10/2003 |
| JP | 2004-345120 | 12/2004 |
| JP | 2005-032591 | 2/2005 |
| JP | 2005-235631 | 9/2005 |
| JP | 2005-285552 | * 10/2005 |
| JP | 2006-62103 | 3/2006 |
| KR | 2002-0084159 | 11/2002 |
| WO | 01/80339 | 10/2001 |

OTHER PUBLICATIONS

Toniazzo, New separators for industrial and specialty lead acid batteries, Journal of Power Sources 107 (2002) 211-216, Elsevier Science B.V.

Japanese Office Action for corresponding JP Application No. 2006-268454, Mar. 13, 2012.

* cited by examiner

Fig.5
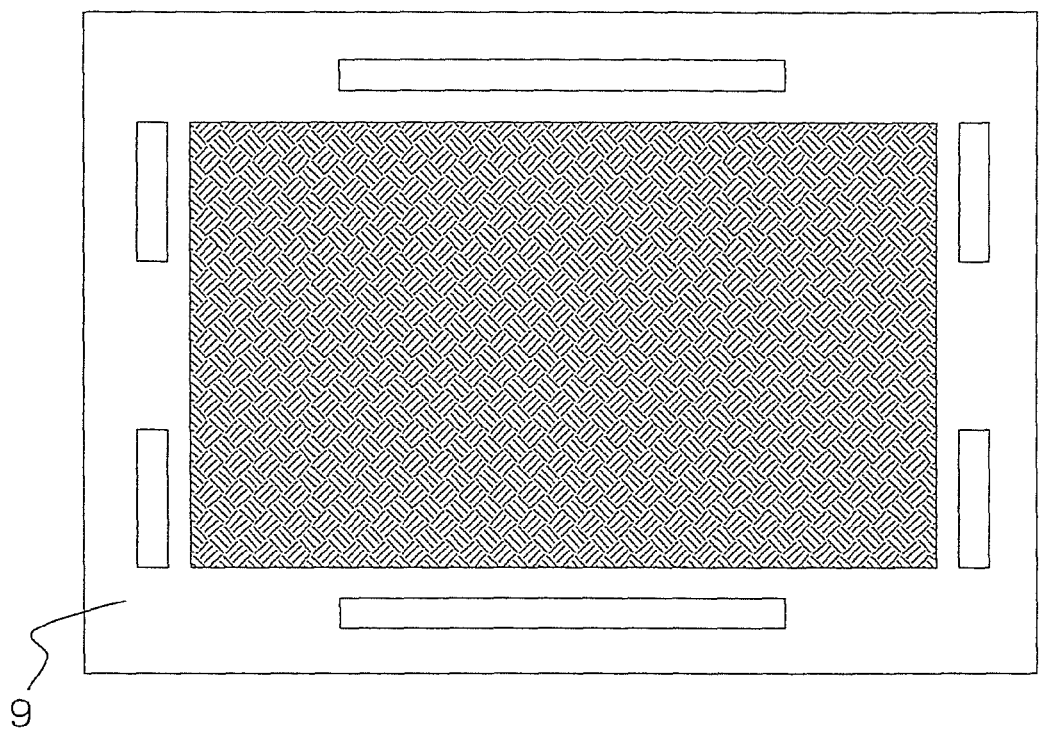
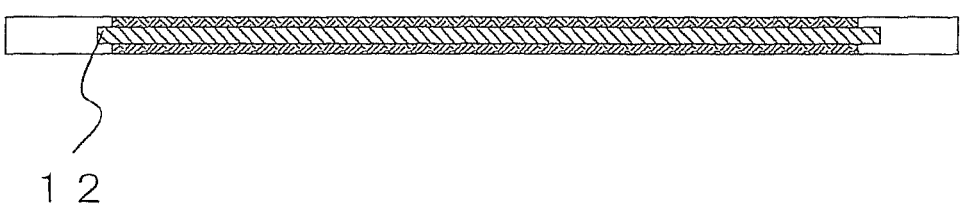
Fig.6

Fig.7
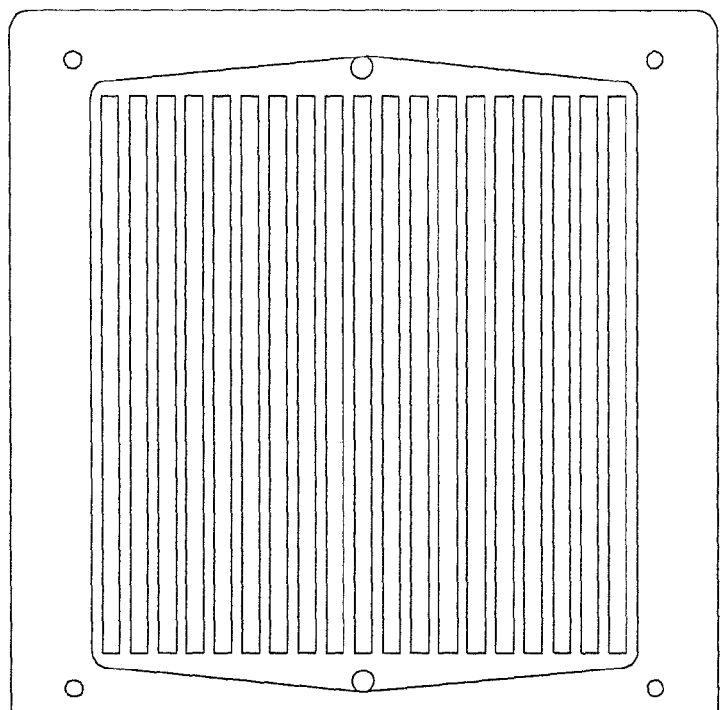
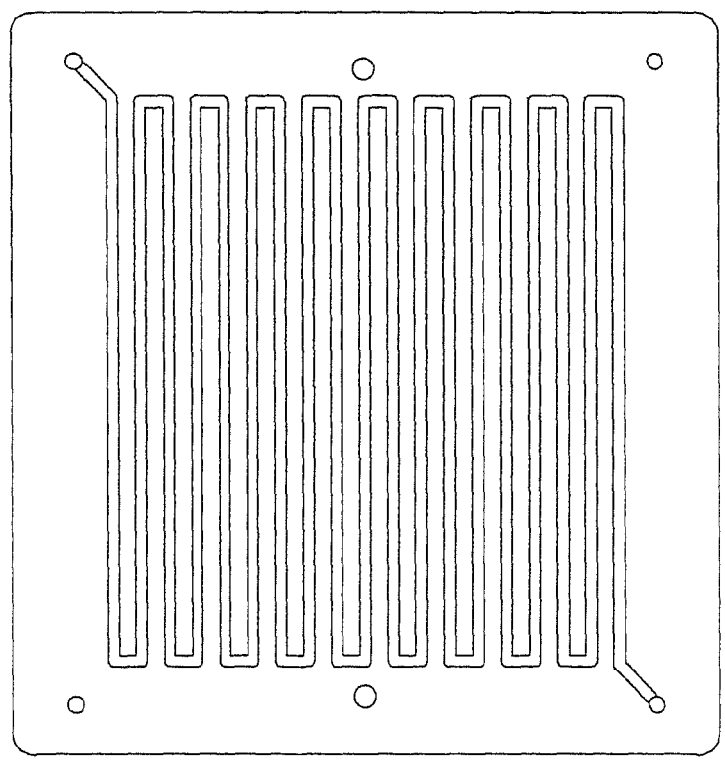

Fig.9
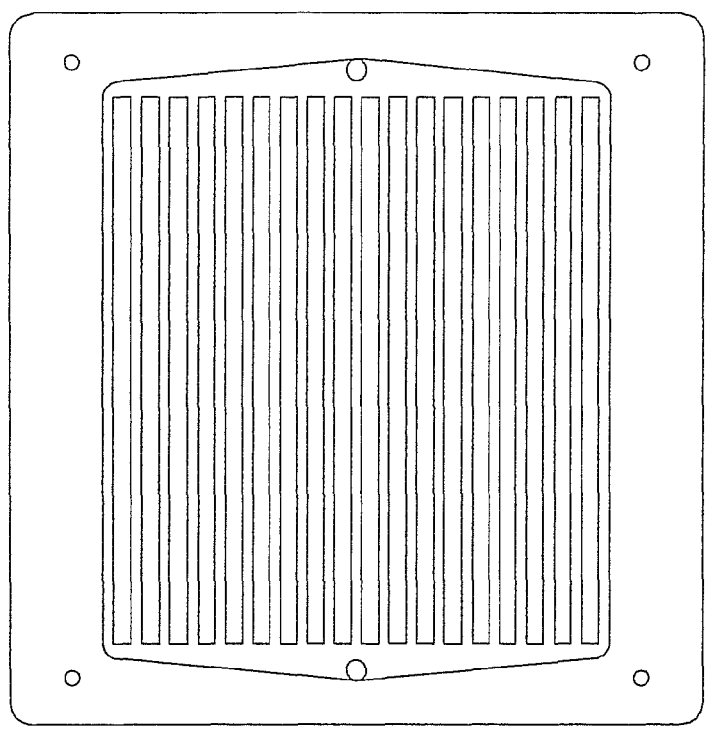
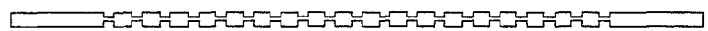
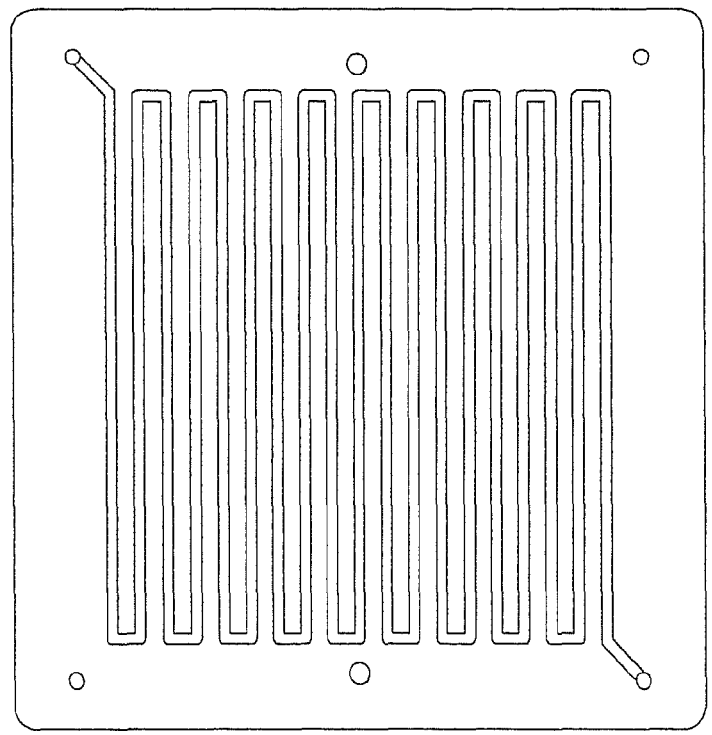

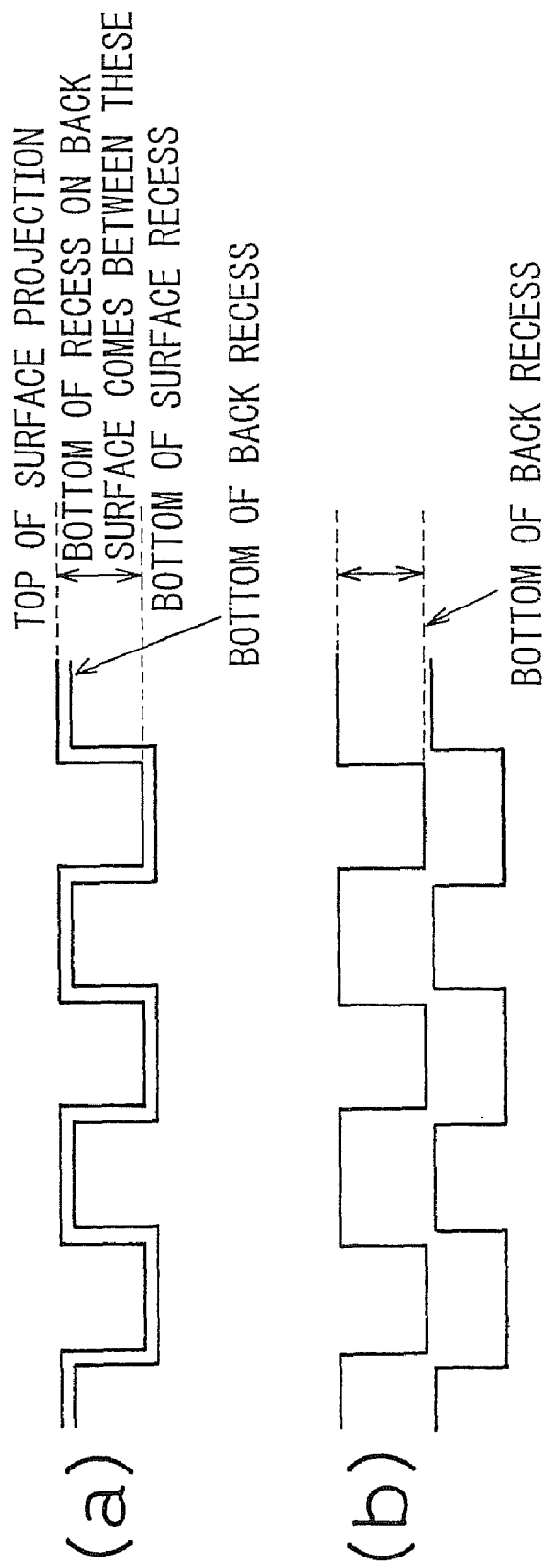

FUEL CELL SEPARATOR HAVING A CORRUGATED ELECTRICALLY CONDUCTING FLOW PATH

TECHNICAL FIELD

The present invention relates to a carbon (carbonaceous) resin-molded separator which is lightweight, compact and excellent in electrical conductivity and mechanical properties, and a production method thereof.

BACKGROUND ART

In recent years, from the standpoint of environmental issues and energy problems, fuel cells have been attracting attention. A fuel cell is a clean power generating device which generates electric power by a reverse electrolysis reaction of water using hydrogen and oxygen and only discharges water, which is classified into several species according to the kind of the electrolyte and among these, a solid polymer-type fuel cell operates at a low temperature and is most promising for automobile or electrical appliances. Such a fuel cell is fabricated, for example, by stacking single cells each comprising a polymer solid electrolyte, a gas diffusing electrode, a catalyst and a separator, whereby high-output power generation can be achieved.

The fuel cell having the above-described construction has a separator for dividing single cells. A flow path (groove) for supplying a fuel gas (e.g., hydrogen) and an oxidant gas (e.g., oxygen) and for discharging water (water vapor) generated is usually formed on the separator. Therefore, the separator is required to have high gas impermeability enabling complete separation of these gases and high electrical conductivity for decreasing internal resistance. Furthermore, the separator is required to be excellent in heat conductivity, durability, strength and the like.

For the purpose of satisfying these requirements, the separator for a fuel cell has been studied from both aspects of a metal material and a carbon material. The metal material has a large specific gravity, but is advantageous in that a thin separator can be fabricated because of its excellent mechanical properties, and moreover electrical conductivity is high. However, there is a problem in corrosion resistance. Studies are being made on the design of a surface treatment or composition that has excellent corrosion resistance.

On the other hand, many studies have also been made with regard to carbon material, and examples of the material for the fuel cell separator include a molded article obtained by press-molding an expanded graphite sheet, a molded article obtained by impregnating a carbon sintered body with a resin and curing it, a glass-like carbon obtained by firing a thermosetting resin, and a molded article obtained by mixing a carbon powder and a resin and molding the mixture.

For example, Patent Document 1 discloses a complicated process of adding a binder material to a carbonaceous powder, mixing these under heating, subjecting the mixture to CIP molding (cold isostatic pressing), firing and graphitization, impregnating the obtained isotropic graphite material with a thermosetting resin and after curing, engraving a groove by cutting.

Also, Patent Document 2 discloses a technique of impregnating carbon powder- or carbon fiber-containing paper sheets with a thermosetting resin, stacking and press-bonding the paper sheets, and firing the stack, and Patent Document 3 discloses a technique of injection molding a phenol resin in a separator-shaped mold, and firing the molded article.

Such a material obtained through firing as in these examples exhibits high electrical conductivity and high heat resistance, but has problems that firing takes a long time to make the productivity low or that brittle destruction readily occurs. Furthermore, in the case where cutting is necessary, mass productivity is decreased and cost rises. For these reasons, the material will be difficult to spread in the future.

Meanwhile, reduction in contact resistance, which is a factor governing the electrical conductivity of the fuel cell separator is important. Some attempts have been made to reduce the contact resistance by devising a separator structure. For example, Patent Document 4 discloses a technique of coating a separator surface with a metal or carbon having high electrical conductivity, Patent Document 5 discloses a technique of applying an electrically conducting polymer to the surface of a molded article of an electrically conducting resin composition, and Patent Document 6 discloses a technique of applying an electrically conducting material to the surface or embedding it in the inside in the longitudinal direction.

In addition, Patent Document 7 discloses a technique of cutting the resin-rich layer (a layer rich in resin) on the separator surface to increase the area ratio of carbon powder on the surface, Patent Document 8 discloses a technique of using rubber for the binder to enhance the adhesion on the contact surface, Patent Document 9 discloses a technique where a separator having a power generating part composed of a carbon-based material and an outer frame portion composed of an electrically non-conducting polymer material is processed by insert molding, and Patent Document 10 discloses a technique where a separator and a gasket are integrated.

[Patent Document 1] Kokai (Japanese Unexamined Patent Publication) No. 8-222241
[Patent Document 2] Kokai No. 60-161144
[Patent Document 3] Kokai No. 2001-68128
[Patent Document 4] Kokai No. 2001-196076
[Patent Document 5] Kokai No. 2002-8685
[Patent Document 6] Kokai No. 2001-52721
[Patent Document 7] Kokai No. 2003-282084
[Patent Document 8] Kokai No. 2001-216977
[Patent Document 9] WO01/80339
[Patent Document 10] Kokai No. 2005-235631

As described above, the separator for a fuel cell is conventionally required to satisfy, particularly, high electrical conductivity, gas impermeability, strong corrosion resistance and low cost. Furthermore, a lightweight and compact separator capable of exerting its high performance in a limited space is demanded.

In order to meet these requirements, a resin mold-type carbon-based material not requiring a cutting step is being taken notice of, and development thereof is proceeding. However, although the amount of the electrical conductivity-imparting material packed needs to be greatly increased to express high electrical conductivity, reduction in the resin content is limited for maintaining the moldability and sufficiently high electrical conductivity cannot be obtained. Also, the carbon-based separator has a low specific gravity as compared with metal and can advantageously contribute to light-weighting, but when the wall thickness is reduced, cracking readily occurs and the reliability of gas shielding decreases. In this way, a separator as thin as a metal separator is difficult to produce.

In the case of fabricating a fuel cell stack, a gasket or a packing is mainly used to prevent the escape of gas but since the number of fabrication steps increases and the process becomes cumbersome, a structure not using such a gasket or packing is demanded.

Furthermore, in the case of a conventional separator, as shown in FIG. 12, the flow path has a shape of symmetry from front to back and has a largely uneven thickness and when the material has a high viscosity, the processability is bad and a density difference is readily produced between thick-wall part and thin-wall part. In this meaning, high flowability is required for molding a separator with excellent surface precision.

An object of the present invention is to overcome these drawbacks of conventional techniques and provide a lightweight, compact and high-performance fuel cell separator and a production method thereof.

DISCLOSURE OF INVENTION

As a result of intensive studies, the present inventors have found that a thin separator having a corrugated flow path can be molded at a high speed by a processing method of molding a thermoplastic resin composition highly filled with a carbonaceous material into a thin sheet form, heating the sheet to a melted state, and cold-shaping the melt at a high speed; and also found that such a corrugated thin separator is very effective for solving the above-described problems of conventional techniques. The present invention has been accomplished based on these findings.

The present inventors have further proceeded with studies, as a result, it has been found that particularly when the flow path is formed in a corrugated shape with less unevenness in the thickness, the process is only to change the shape almost without flowing the material and application of a high-viscosity material highly filled with a filler is optimal, and also found that since the thin separator of the present invention having the above-described construction is highly filled with a carbonaceous material to ensure very high heat conductivity and enable rapid solidification, high-speed cold shaping by stamp-molding is effective.

In addition, the present inventors have found that when the sheet is formed in a multilayer structure, the contact resistance with the gas diffusing electrode can be reduced.

In other words, the present invention includes, for example, the embodiments in the following embodiments [1] to [20]

[1] A separator for a fuel cell, comprising an electrically conducting resin composition, and comprising an electrically conducting flow path part; wherein the electrically conducting resin composition comprises a carbonaceous material (A) and a thermoplastic resin composition (B) at a mass ratio (A)/(B) of 1 to 20 with a total mass of (A) and (B) accounting for 80 to 100 mass % in the composition;

the electrically conducting flow path part has a corrugated shape having a recess and a projection on each of front and back surfaces thereof, where the recess constitutes a groove for a flow path; and the electrically conducting flow path part has a wall thickness of 0.05 to 0.5 mm and a maximum wall thickness/minimum wall thickness ratio of 1 to 3.

[2] The separator for a fuel cell as set forth in [1], wherein the density of the flow path part is from 1.2 to 2.5 g/cm$^3$.

[3] The separator for a fuel cell as set forth in [1] or [2], wherein the recess of the flow path part has a curved shape in the cross section and the projection has a flat surface.

[4] The separator for a fuel cell as set forth in any one of [1] to [3], wherein in the cross section of the flow path part, an offset allowing flat surfaces of the projections to overlap by from 0.05 to 0.5 mm between front and back surfaces is provided.

[5] The separator for a fuel cell as set forth in any one of [1] to [4], wherein the thermoplastic resin composition (B) comprises a component having a glass transition temperature of −20° C. or less.

[6] The separator for a fuel cell as set forth in any one of [1] to [5], wherein the thermoplastic resin composition (B) comprises from 0.05 to 30 mass % of an elastomer component (C), based on a total mass of the thermoplastic resin composition (B).

[7] The separator for a fuel cell as set forth in [6], wherein the average particle diameter of the elastomer component (C) is from 0.01 to 5 μm and is smaller than the average particle diameter or average fiber length of the carbonaceous material (A).

[8] The separator for a fuel cell as set forth in any one of [1] to [7], wherein the thermoplastic resin composition (B) comprises a crystalline hydrocarbon-based polymer having a melting point of 100° C. or more.

[9] The separator for a fuel cell as set forth in any one of [1] to [8], wherein the carbonaceous material (A) comprises from 0.05 to 5 mass % of boron, based on a total mass of the carbonaceous material (A).

[10] The separator for a fuel cell as set forth in any one of [1] to [9], wherein the carbonaceous material (A) comprises from 0.1 to 50 mass %, based on a total mass of the carbonaceous material (A), of at least either one of a vapor grown carbon fiber and a carbon nanotube each having a diameter of 200 nm or less.

[11] The separator for a fuel cell as set forth in any one of [1] to [10], wherein a first electrically conducting resin composition layer having a first composition and a second electrically conducting resin composition layer having a composition different from the first composition are stacked.

[12] The separator for a fuel cell as set forth in [11], wherein natural graphite is contained in either one or both of the first electrically conducting resin composition layer and the second electrically conducting resin composition layer.

[13] The separator for a fuel cell as set forth in [11] or [12], wherein the separator has a multilayer structure with the first electrically conducting resin composition layer being a center layer and the second electrically conducting resin composition layer being an outer layer and the flexural modulus of the second electrically conducting resin composition layer is ½ or less of the flexural modulus of the first electrically conducting resin composition layer.

[14] The separator for a fuel cell as set forth in [13], wherein the melting point of the second electrically conducting resin composition layer is lower than the melting point of the first electrically conducting resin composition layer.

[15] The separator for a fuel cell as set forth in any one of [1] to [14], wherein the contact resistance of an MEA with a gas diffusing layer is 30 mΩcm$^2$ or less under the pressure condition of 2 MPa.

[16] A method for producing a separator for a fuel cell, comprising the steps of:

heating a sheet comprising an electrically conducting resin composition comprising a carbonaceous material (A) and a thermoplastic resin composition (B) at a mass ratio (A)/(B) of 1 to 20 with the total mass of (A) and (B) accounting for 80 to 100 mass % in the composition, to the melting temperature of the sheet, and inserting the heated sheet into a mold set to not more than the solidification temperature of the sheet and then stamp-molding the sheet.

[17] The method for producing a separator for a fuel cell as set forth in [16], wherein the thickness of the sheet is from 0.05 to 2 mm.

[18] The method for producing a separator for a fuel cell as set forth in [16] or [17], wherein the stamp-molding is to perform stamp-molding for 10 seconds or less by a cold press molding machine after closing the mold until the completion of pressure intensification.

[19] The method for producing a separator for a fuel cell as set forth in any one of [16] to [18], wherein the sheet is a stacked sheet having a plurality of layers differing in the composition.

[20] A separator for a fuel cell, produced by the method as set forth in any one of [16] to [19], wherein the stamp-molding forms a corrugated shape having a recess and a projection on each of front and back surfaces of the sheet, where the recess constitutes a groove for a flow path, and the separator has a wall thickness of 0.5 mm or less and a maximum wall thickness/minimum wall thickness ratio of 1 to 3.

The separator for a fuel cell of the present invention is lightweight and assured of low contact resistance and excellent properties as the separator. Also, according to the production method of the present invention, a groove can be formed on both surfaces of a sheet comprising an electrically conducting resin composition by stamp-molding, so that a separator for a fuel cell can be provided at a low cost.

BRIEF DESCRIPTION OF DRAWINGS

FIG. 5 is a partially enlarged view showing one example of the MEA used in FIG. 4.

FIG. 6 is a schematic cross-sectional view showing the separator for a fuel cell obtained in Examples of the present invention.

FIG. 7 is an overall view showing the serpentine flow path of the separator for a fuel cell obtained in Examples of the present invention.

FIG. 9 is an overall view showing the serpentine flow path of the separator for a fuel cell obtained in Comparative Examples of the present application.

FIG. 13 is a schematic cross-sectional view showing one example of the corrugated shape suitable in the present invention.

Figure 1:
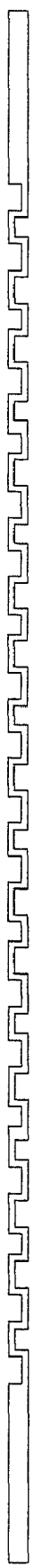
FIG. 1 is a schematic cross-sectional view showing one example of the separator for a fuel cell of the present invention having a corrugated electrically conducting flow path part.

In the Drawings, 1 is a separator for fuel cell, 2 is a flow path (for reaction gas), 3 is a projection, 4 is a recess, 5 is an offset of projections of front and back flow paths, 6 is a carbon paper, 7 is a supporting plate (gold-plated brass plate), 8 is an MEA, 9 is a frame body part, 10 is an MEA body, 11 is a specimen (separator), 12 is an MEA (solid polymer membrane+catalyst+carbon paper), 13 is an insulating frame body, and 14 is a five-layer structure MEA.

BEST MODE FOR CARRYING OUT THE INVENTION

The present invention is described in detail below by referring to the drawings. In the following, unless otherwise indicated, "%" showing a quantitative ratio is on the mass basis.

(Shape of Separator for Fuel Cell)

The separator for a fuel cell of the present invention comprises an electrically conducting resin composition comprising a carbonaceous material (A) and a thermoplastic resin composition (B) and has a corrugated flow path part.

(Corrugated Shape)

The corrugated shape indicates a structure having a recess and a projection, where, as shown in FIG. 1, grooves on the front and back surfaces, each constituting a gas flow path, are alternately arrayed abreast in a plane.

As for the corrugated separator, a metal-made separator is already known. A conventional electrically conducting resin composition readily causes breakage due to high brittleness or makes it difficult to reduce the thickness due to low flowability, and a corrugated separator can be hardly produced therefrom.

In the present invention, an electrically conducting thermoplastic resin composition enabling formation of a sheet in 0.5 mm or less and means for formation into a sheet have been found, and it has become possible to mold a separator at a high speed comparable to the speed in the press molding of a metal by using a stamp-molding method. Only a flow path in a limited shape can be formed by the press molding of a metal, but in the present invention, the sheet is melted, so that a groove or flow path pattern in various shapes can be formed. By virtue of employing the stamp-molding method of the present invention, production of a separator with a small wall thickness and less fluctuation in the thickness at a low cost has been enabled.

The separator for a fuel cell of the present invention may form a gas seal by using a gasket or a packing as usually done but may be preferably molded integrally with a gasket or a packing. More preferably, a gas seal may be formed by welding without using a gasket or a packing and from 2 to 20 cells may be unitized, whereby a lightweight packingless stack can be fabricated. In other words, although a packing is used in a normal separator for preventing gas leakage; a gas seal can be formed without a packing in the present invention, so that the number of parts can be decreased and the weight can be more reduced.

In the present invention, the cross-sectional shape may be preferably such a shape that the right back of a recess on the first main plane forms a projection on the second main plane and the bottom of a recess on the second main plane comes to a height between the top of a projection and the bottom of a recess on the first main plane, because the separator can be made thin. In other words, the shape shown in FIG. 13(*a*) described later may be more preferred than the shape shown in FIG. 13(*b*).

In the cross-sectional shape, the flow path site where the back surface of a recess on the first main plane forms a projection on the second main plane and the back surface of a projection on the first main plane forms a recess on the second main plate may preferably occupy 30% or more of the plane area (projected area from right above the separator), because the volume output density can be enhanced.

The width of the recess (groove) may be preferably from 0.1 to 3 mm. If the width is less than 0.1 mm, the pressure loss of gas or refrigerant tends to increase, whereas if the width exceeds 3 mm, unless the groove is deepened by increasing the thickness of the separator, an MEA tends to readily invade the groove when the MEA is stacked.

The width of the projection may be preferably from 0.3 to 5 mm. If the width is less than 0.3 mm, the contact area between an MEA and the separator tends to be reduced to cause heat generation, whereas if the width exceeds 5 mm, the gas diffusibility tends to worsen.

The depth of the recess may be preferably from 0.2 to 1 mm. If the depth is less than 0.2 mm, the pressure loss of gas tends to increase, whereas if the depth exceeds 1 mm, the separator becomes thick and this may be not preferred.

The recess width/recess depth ratio may be preferably from 0.3 to 2.5. If the ratio is less than 0.3, the processability tends to worsen, whereas if the ratio exceeds 2.5, an MEA tends to invade the groove when the MEA is stacked.

The width of the recess and projection was measured at the center in the depth direction of a groove (recess).

The groove on the first main plane and the groove on the second main plane may be the same or different in the dimension. The relative ratio in the width between the recess and the projection on the same main plane may be preferably from 0.1 to 4. If the relative ratio is less than 0.1, the contact resistance tends to increase, whereas if it exceeds 4, the gas diffusibility tends to worsen.

(Welding)

The term "welding" as used in the present invention means that at least one member out of two bodies to be joined is melted by heat and these two bodies are thereby integrated. More specifically, even when only one member to be joined is melted and another is not melted, it may suffice if two members are integrated to an extent not causing separation unless an external force is applied. The welding also includes such a case that two members are put into a partially joined state by spot-applying heat and can hold the integrated state unless an external force is applied. A jointed state brought about by an anchor effect that the surface of one member in contact is melted and the melted material intrudes into irregularities or holes on the surface of another member may be also included. Incidentally, the portions required to form a gas seal usually need to be completely contacted and put into a state of causing no gas leakage. A jointed state where contact surfaces of two bodies are melted to completely eliminate interface is preferred. In the present invention, even when the interface is not completely eliminated by welding, it may suffice if the gas seal is maintained.

(Gas Flow Path Part)

In FIG. 1, the density of the gas flow path part in the separator of the present invention may be preferably from 1.2 to 2.5 g/cm$^3$, more preferably from 1.4 to 2.4 g/cm$^3$, still more preferably from 1.6 to 2.3 g/cm$^3$. If the density of the gas flow path part exceeds 2.5 g/cm$^3$, the weight tends to increase, whereas if it is less than 1.2 g/cm$^3$, the blending amount of the carbonaceous material for imparting electrical conductivity may be substantially decreased and only a separator with low electrical conductivity tends to be obtained.

The wall thickness of the gas flow path part in the separator for a fuel cell of the present invention (the minimum distance allowing for penetration into the flow path part on the back surface from an arbitrary point of the flow path part on the front surface) may be from 0.05 to 0.5 mm, preferably from 0.05 to 0.4 mm, more preferably from 0.05 to 0.3 mm. If the wall thickness is less than 0.05 mm, gas leakage may readily occur, whereas if the wall thickness exceeds 0.5 mm, the weight of the separator may increase.

(Wall Thickness Ratio of Gas Flow Path Part)

The maximum wall thickness of the gas flow path part may be from 1 to 3 times, preferably from 1 to 2 times, more preferably from 1 to 1.5 times, the minimum wall thickness. If the flow path has an uneven thickness exceeding 3 times, the high-speed shaping of the flow path may become flow-molding, as a result, in the molding of a thin separator, there may arise a problem such as generation of density unevenness or remaining residual stress.

(Shape of Gas Flow Path Part)

Figure 2:
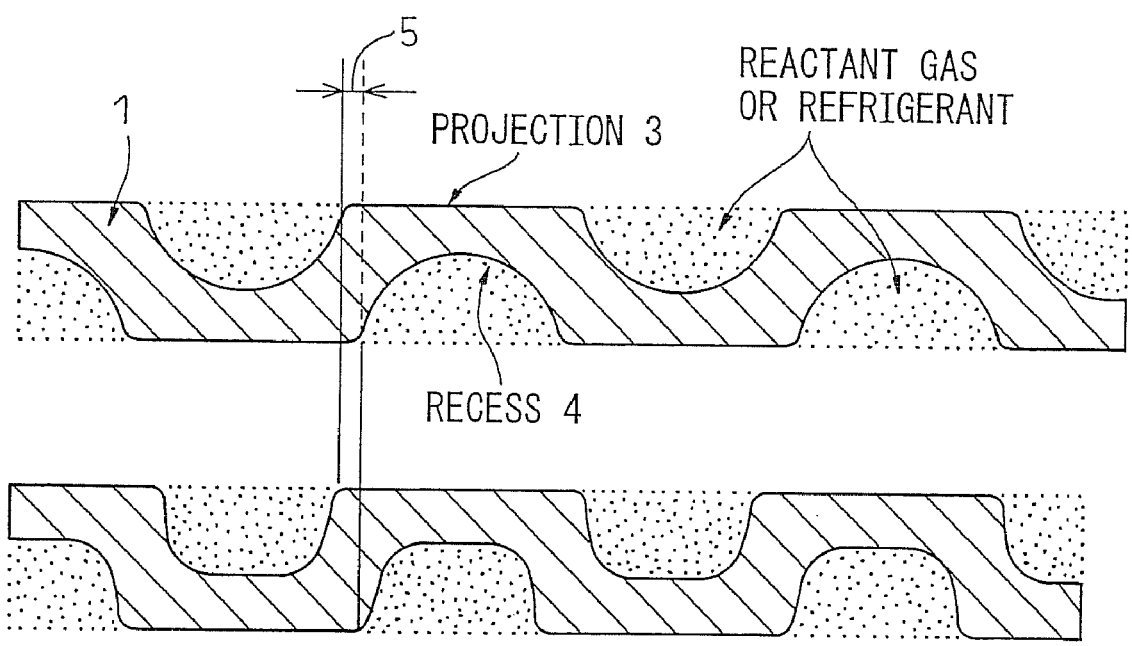
FIG. 2 is a partial cross-sectional view showing one example of the corrugated electrically conducting flow path part of the present invention.

As for the cross-sectional shape of the flow-path part, the bottom of the recess may be made flat but, as shown in FIG. 2, when the bottom of the recess is shaped to have a curve with a radius of 0.05 mm or more, discharge of produced water may be facilitated and this may be preferred. If the radius of the curve is less than 0.05 mm, the effect of facilitating the discharge of water tends to decrease.

In the present invention, the embodiment where the projection in the cross-sectional shape of the flow path part has a flat surface is advantageous in that the contact resistance with an MEA (membrane electrode assembly) constituting a fuel cell can be decreased. In the case of a projection having a circular or elliptical shape, the contact area with an MEA tends to decrease.

(Offset)

For the purpose of preventing the flow path part from cracking, collapsing and creeping, an offset shown in FIG. 2 (in other words, an overlapped portion between front and back projections) may be preferably provided such that flat surfaces of the projections in the cross-sectional shape of the flow path part overlap by from 0.05 to 0.5 mm between front and back surfaces. The offset may be more preferably from 0.08 to 0.4 mm, still more preferably from 0.1 to 0.3 mm. If the offset is less than 0.05 mm, the flow path tends to be readily deformed due to expansion or shrinkage of the MEA, whereas if the offset exceeds 0.5 mm, the distance between flow paths may increase and the diffusion of gas tends to worsen.

(Electrically Conducting Resin Composition)

The electrically conducting resin composition constituting the separator of the present invention may preferably contain a component having a glass transition temperature of −20° C. or less. The glass transition temperature may be more preferably −30° C. or less, still more preferably −40° C. or less. If the glass transition temperature exceeds −20° C., the separator may be worsened in the low-temperature property and may be cracked in a cold region or in a vigorously vibrating environment.

(Glass Transition Temperature)

The method for measuring the glass transition temperature (hereinafter simply referred to as "Tg") of the gas flow path part in the separator of the present invention is not particularly limited. Examples thereof include a method of measuring the heating value by a differential scanning calorimeter and determining the Tg, a method of measuring the thermal expansion value in the thickness direction by a thermal analyzer and determining the Tg, and a method of measuring the dynamic viscoelasticity and loss tangent of a specimen by a viscoelasticity measuring apparatus and determining the Tg from the peak temperature of the loss tangent. In the present invention, the Tg was determined from the peak of the loss tangent by using a dynamic viscoelasticity measuring apparatus (Bohlin C-VOR, manufactured by Malvern Instruments). More specifically, as for the measurement conditions, the conditions for entering a region of linear viscoelasticity at a frequency of 0.001 to 1 Hz and a strain of 0.01 to 1% in a torsion mode were determined, and the measurement was performed by the strain control at a temperature rising rate of 5° C./min in the range from −100 to 100° C. In the measurement, a specimen having a thickness of 1 to 2 mm, a width of 10 mm and a length of 32 to 36 mm was used.

(Contact Resistance of Gas Flow Path Part)

In the separator comprising an electrically conducting resin composition of the present invention, the gas flow path part may preferably have a contact resistance with the gas diffusing layer of 30 mΩcm$^2$ or less under the pressure condition of 2 MPa. The contact resistance may be more preferably 25 mΩcm$^2$ or less, still more preferably 20 mΩcm$^2$ or less. If the contact resistance exceeds 30 mΩcm$^2$, the voltage may greatly drop to incur reduction in output.

(Contact Resistance Measuring Method)

Figure 3:
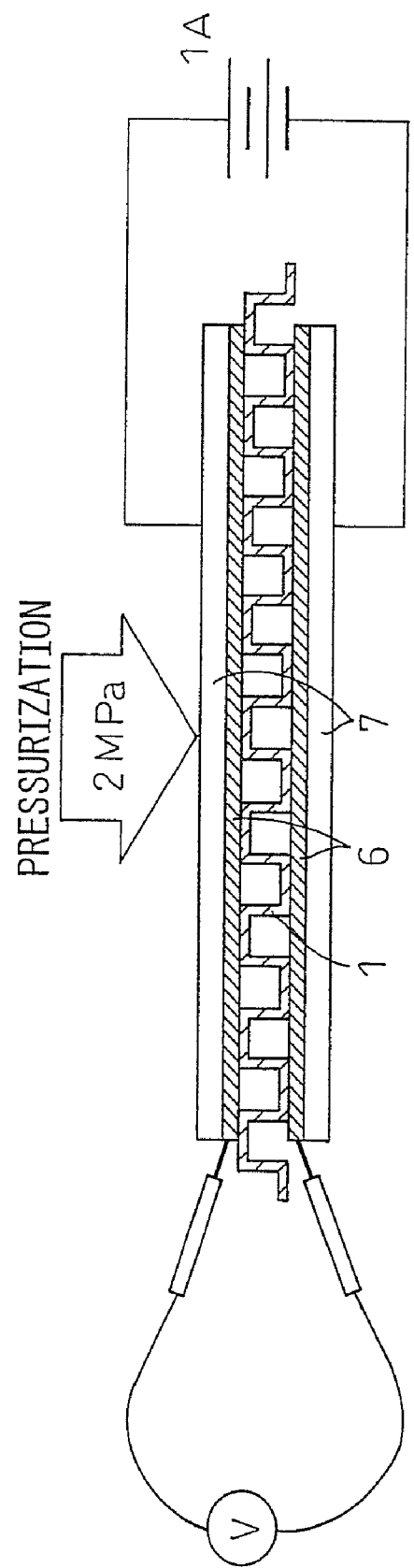
FIG. 3 is a schematic view for explaining the contact resistance measuring method used in the present invention.

FIG. 3 is a schematic view showing the contact resistance measuring method. A specimen was sandwiched by two carbon papers (TGP-H-060, produced by Toray Industries, Inc.), these were further sandwiched by two gold-plated brass plates, a pressure of 2 MPa is uniformly applied thereto, a constant current of 1 A was passed in the penetration direction between gold-plated brass plates, the voltage between carbon papers was measured, and the contact resistance was calculated according to formula 1. The area of each of the carbon paper and gold-plated brass plate can be arbitrarily set according to the size of the separator, but in the present invention, the contact resistance was measured with an electrode area of 20 mm square.

$$Rc=(V/I)\times(S/2) \quad \text{[Formula 1]}$$

wherein Rc is the contact resistance (mΩcm$^2$), V is the voltage (mV), I is the current (A), S is the contact effective area (cm$^2$) on one surface between the separator and the carbon paper (gas diffusing layer).

(Melting Point of Outer Layer)

For the purpose of reducing the contact resistance between the gas diffusing layer and the separator, the melting point of the outer layer (corresponding to a second electrically conducting resin composition layer) on at least one surface out of front and back surfaces of the separator may be preferably made to be lower than the melting point of the center layer (corresponding to a first electrically conducting resin composition layer). The melting point of the outer layer is preferably lower than the melting point of the center layer by 10° C. or more, or more preferably by 20° C. or more. If the melting point of the outer layer is higher than the melting point of the center layer, the weld strength may decrease and welding to the gas diffusing layer tends to be hardly achieved. In the case of welding the outer layer to the gas diffusing layer, heating is performed at a temperature between the melting point of the outer layer and the melting point of the center layer.

The melting point of the outer layer is preferably 100° C. or more, more preferably 120° C. or more. If the melting point of the outer layer is less than 100° C., the performance of the fuel cell tends to degrade. The thickness of the outer layer may be from 0.1 to 0.001 mm, more preferably from 0.05 to 0.001 mm. If the thickness of the outer layer exceeds 0.1 mm, the flow path may be readily deformed, however, if it is less than 0.001 mm, the weld strength may not be enhanced. Examples of such a construction include a three-layer structure where an outer layer is disposed on both sides of a center layer, but as long as the melting point of the outer layer welded to the gas diffusing layer is lower than the melting point of the center layer, the construction is not limited to a three-layer structure and may comprise four or more layers. In the case of contacting the gas diffusing layer only at one surface, a two-layer construction where the melting point of only the outer layer on one surface is made lower than the melting point of the center layer may also be employed. The melting point measuring method for use in the present invention is not particularly limited, but the melting point may be measured, for example, by the DSC method described in JIS K7121. In the present invention, the melting point was measured by DSC-7 manufactured by Perkin-Elmer.

(Stacking Configuration)

Figure 4:
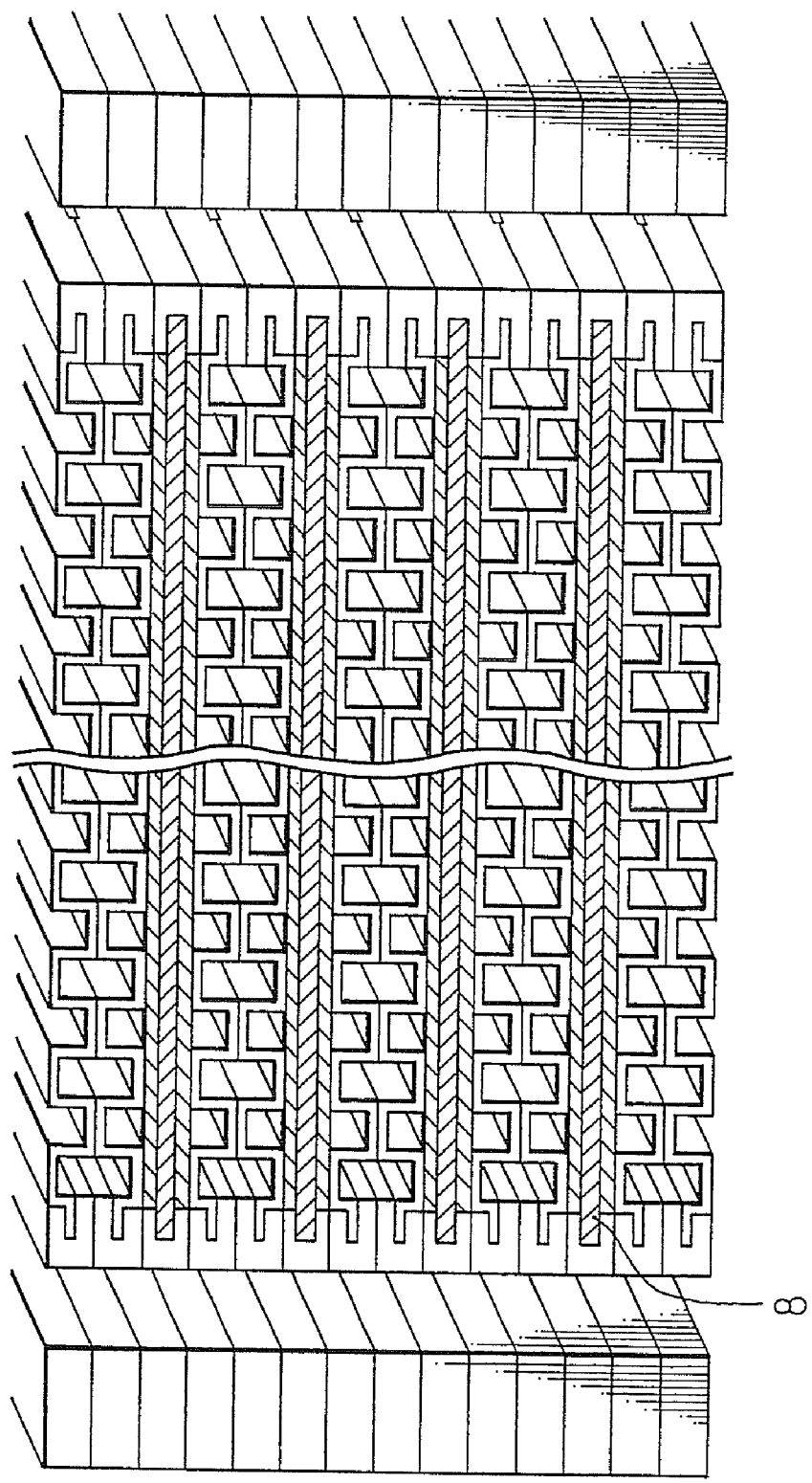
FIG. 4 is a schematic cross-sectional view showing one example of the stacking configuration using the separator of the present invention.

FIG. 4 is a schematic cross-sectional view showing one example of the stacking configuration using the separator of the present invention. The MEA used in FIG. 4 may be preferably prepared, as shown in the partially enlarged view of FIG. 5, for example, by joining a catalyst layer to both surfaces of a solid polymer electrolyte membrane, sandwiching both surfaces of the catalyst layer with carbon paper or the like working out to a gas diffusing layer, thereby fabricating a five-layer structure, and covering its outer circumference with an insulating thermoplastic resin composition, but the present invention is not limited thereto. The MEA shown in FIG. 5 is made weldable to the separator of the present invention by employing a construction that the material for the frame body part is a thermoplastic resin composition containing at least one same polymer out of the components contained in the separator of the present invention or containing a compatibilizer or that the polymer constituting the separator and the material for the frame body part of an MEA are thermoplastic resin compositions containing respective components working out to a pair of polymers having miscibility or compatibility, whereby the packingless stack unit shown in FIG. 4 can be fabricated. The melting point measuring method for use in the present invention is not particularly limited, but the melting point may be measured, for example, by the DSC method described in JIS K7121. In the present invention, the melting point was measured by DSC-7 manufactured by Perkin-Elmer.

The miscibility means that the polymers have a capability of forming a single phase as a result of their melting and mixing. The thermodynamic requirement may be that the Gibbs free energy of mixing ΔG is less than zero (ΔG<0), and whether a single phase or not can be confirmed by a scattering method (e.g., light scattering, X-ray scattering, neutron scattering) (see, *Polymer ABC Handbook*, compiled by Kobunshi ABC Kenkyu Kai, the Society of Polymer Science, Japan, page 4 and page 196, and D. R. Paul, *Encycl. Polym. Sci. Eng., Vol.* 12, page 399, John Wiley & Sons (1988)). Examples of the combination having miscibility include polypropylene/polypropylene (a combination differing in the molecular weight, molecular weight distribution or the like), high-density polyethylene/high-density polyethylene (a combination differing in the molecular weight, molecular weight distribution or the like), polyphenylene ether/polystyrene, polypropylene/polybutene-1, and polymethyl methacrylate/polyvinyl acetate.

The compatibility means that the polymers are non-miscible, but have some ability of effecting interfacial bonding between the polymers. Examples of the combination having compatibility include the followings.

1) A combination having a molecular chain with the same segmental structure in the polymer. For example, polymers cannot be mixed in the form of a polymer A and a polymer B but when an A-B graft copolymer, block copolymer or random copolymer is formed, the polymer can be compatibilized with both the polymer A and the polymer B and partially effect molecular intertwining. Accordingly, the combination may be a combination such as polymer A/A-B copolymer, and polymer B/A-B copolymer. Furthermore, a combination of a mixture of polymer A and A-B copolymer/a mixture of polymer B and A-B copolymer, in which the A-B copolymer works as the compatibilizer, may also be employed. Specific examples of the combination in this class include polypropylene/styrene ethylene butylene styrene copolymer and polypropylene/ethylene propylene rubber.

2) A combination with the difference in the solubility parameter being less than 1.0 (as regards the method for calculating the solubility parameter of a polymer, see, for example, *SP Chi Kiso•Oyo to Keisan Houhou* (*Basis•Application and Calculation Method of SP Value*), Chapters 5 and 6, Joho Kiko Shuppan K.K. (March, 2005)). When the difference in the solubility parameter is small, the polymers are close in the cohesion energy density and can be well mixed. Examples of this combination include butadiene-acrylonitrile rubber (NBR)/polyvinyl chloride (PVC). The solubility parameter of NBR is 9.4, the solubility parameter of PVC is 9.5, and these are very close. In addition, polypropylene/hydrogenated styrene butadiene rubber is also included in this class.

3) A combination exhibiting a strong interaction between polymers, in other words, a combination having an intermolecular interaction such as van der Waals' force, dipole/dipole force, hydrogen bonding, charge transfer force, ion/ion interaction, acid/base force and covalent bonding. Examples of this combination include maleic anhydride-modified polyethylene/polyamide, polyvinyl chloride/chlorinated polyethylene, liquid crystal polymer/polybutylene phthalate, and polycarbonate/acrylonitrile butadiene styrene copolymer.

The compatibilizer is a polymer which works as a surfactant for polymers A and B incapable of being mixed and decreases the free energy at the interface. Accordingly, a polymer having miscibility and compatibility also has a function as a compatibilizer.

In the present invention, it may be preferred that both the separator and the MEA frame body part contain at least one same polymer, at least one member contains a compatibilizer, or these members are a combination working out to a pair of polymers having miscibility or compatibility.

(Adhesive Functional Group)

For the purpose of enhancing the strength at the interface, a component having a functional group capable of adhering to the separator or MEA frame body part through a chemical reaction may be incorporated, if desired. Examples of this adhesive functional group include, but are not limited to, a polymer or monomer having a hydroxyl group, a carboxyl group, an amino group, an epoxy group, an isocyanate group, a glycidyl methacrylate group, a carbonyl group, an acryl group, a maleic anhydride group, a silyl group or an amine-based functional group. By virtue of containing such a component, interface strengthening means is applied and interfacial delamination due to heat history can be more effectively suppressed.

(Ratio of Component (A) to Component (B))

As for the ratio of the component (A) to the component (B) in the electrically conducting resin composition usable in the present invention, the mass ratio of the component (A) to the component (B) (referred to as (A)/(B)) may be from 1 to 20, preferably from 1.5 to 20, more preferably from 2 to 20. If the mass ratio (A)/(B) is less than 1, insufficient electrical conductivity tends to result, whereas if the mass ratio (A)/(B) exceeds 20, the processability tends to deteriorate.

(Component (A))

The component (A) which is a carbonaceous material for use in the present invention includes one species or a combination of two or more species selected from carbon black, carbon fiber, amorphous carbon, expanded graphite, artificial graphite, natural graphite, kish graphite, vapor grown carbon fiber, carbon nanotube and fullerene.

Examples of the carbon black as one of the carbonaceous materials above include ketjen black and acetylene black obtained by incomplete combustion of natural gas or the like or by thermal decomposition of acetylene; furnace carbon obtained by incomplete combustion of hydrocarbon oil or natural gas; and thermal carbon obtained by thermal decomposition of natural gas.

The carbon fiber includes a pitch type prepared from heavy oil, by-product oil, coal tar and the like, and a PAN type prepared from polyacrylonitrile.

Examples of the method for obtaining the amorphous carbon include a method of curing a phenol resin and subjecting the cured product to firing and grinding into a powder, and a method of curing a phenol resin in a spherical amorphous powder state and firing the cured product. In order to obtain amorphous carbon having high electrical conductivity, a heat treatment at 2,000° C. or more may be suitably performed.

The expanded graphite powder is, for example, a powder obtained by dipping a graphite with a highly developed crystal structure, such as natural graphite or pyrolytic graphite, in a strongly oxidative solution, such as a mixed solution of concentrated sulfuric acid and nitric acid or a mixed solution of concentrated sulfuric acid and hydrogen peroxide water, to produce a graphite intercalation compound and after water washing, rapidly heating the compound, thereby expanding the graphite crystal in the C axis direction, or a powder obtained by once rolling the powder above into a sheet and grinding the sheet.

The kish graphite is a planarly crystallized carbon precipitated along the temperature drop of melted pig iron in the hot metal preliminary treatment or the like. The kish graphite is generated as a matter mixed in slug or iron oxide and therefore, a high-purity kish graphite is recovered by beneficiation and further ground to finish a powder in a size suitable for usage.

In order to obtain artificial graphite, a coke is usually first produced. As for the raw material of the coke, a petroleum-based pitch, a coal-based pitch or the like is used. Such a raw material is carbonized into a coke. Examples of the method for forming a graphite powder from the coke may generally include a method of grinding and then graphitizing the coke, a method of graphitizing the coke itself and then grinding it, and a method of adding a binder to the coke, molding and firing the mixture, and subjecting the fired product (the coke and this fired product are collectively called a coke and the like) to graphitization and then grinding into a powder. In the raw material coke and the like, the crystal may be preferably not developed as much as possible and therefore, those heat-treated at 2,000° C. or less, preferably 1,200° C. or less, may be suitable.

Examples of the graphitization method which can be used include a method using an Acheson furnace where the powder is charged into a graphite crucible and a current is directly passed thereto, and a method of heating the powder by a graphite heating element.

(Boron)

In the carbonaceous material, from 0.05 to 5 mass % of boron may be preferably contained. If the boron amount is less than 0.05 mass %, the objective graphite powder having high electrical conductivity tends to be hardly obtained, whereas even if the boron is contained in excess of 5 mass %, this tends to scarcely contribute to enhancing the electrical conductivity of the carbon material. The method for measuring the amount of boron contained in the carbonaceous material is not particularly limited. In the present invention, a value measured by the inductively-coupled plasma emission spectrometry (hereinafter simply referred to as "ICP") or inductively-coupled plasma emission and mass spectrometry (hereinafter simply referred to as "ICP-MS") is used. More specifically, a sample after adding thereto sulfuric acid and nitric acid is decomposed under microwave heating (230° C.) (digester method) and further decomposed by adding perchloric acid ($HClO_4$), and the decomposition product is diluted with water and analyzed by an ICP emission analyzer to measure the amount of boron.

As for the method of incorporating boron, a boron source such as B simple element, $B_4C$, BN, $B_2O_3$ and $H_3BO_3$ is added to a simple substance such as coke, pitch, natural graphite, artificial graphite, kish graphite, expanded graphite, carbon black, carbon fiber, vapor grown carbon fiber and carbon nanotube, or a mixture of one or more species thereof and after thoroughly mixing, the obtained mixture is graphitized at about 2,300 to 3,200° C., whereby boron can be incorporated into the carbonaceous material. If the boron compound is non-uniformly mixed, not only a non-uniform graphite powder is obtained but also sintering occurs highly probably at the graphitization. In order to achieve uniform mixing of the boron compound, the boron source may be preferably formed into a powder having a particle diameter of 50 μm or less, preferably about 20 μm or less, and then mixed with the powder such as coke.

How the boron is contained is not particularly limited as long as boron and/or a boron compound is mixed in the graphite, but suitable examples thereof include a mode where boron is present between layers of the graphite crystal, and a mode where a part of carbon atoms constituting the graphite crystal are substituted by boron atom. In the case where a part of carbon atoms are substituted by boron atom, the bond between boron atom and carbon atom may be in any bonding form such as covalent bonding and ion bonding.

(Grinding Method)

In order to grind the coke, artificial graphite, natural graphite and the like, a high-speed rotary grinder (e.g., hammer mill, pin mill, cage mill), a ball mill of various types (e.g., rolling mill, vibrating mill, planetary mill), a stirring mill (e.g., bead mill, attritor, circulating tube-type mill, annular mill), or the like may be used. Furthermore, a screen mill, a turbo-mill, a supermicron mill or a jet mill, which are a pulverizer, may also be used by selecting the conditions. The coke, natural graphite or the like is ground using such a grinder and at this time, the average particle diameter and particle size distribution may be preferably controlled by selecting the grinding conditions and if desired, classifying the powder.

(Classification Method)

The classification of coke powder, artificial graphite powder, natural graphite powder and the like may be performed by any method as long as the particles can be separated, but for example, a sieve classification method or an air classifier such as forced vortex-type centrifugal classifier (e.g., micron separator, turbo-plex, turbo-classifier, superseparator) or inertial classifier (e.g., modified virtual impactor, elbow jet) may be used. A wet sedimentation or centrifugal classification method may also be used.

(Vapor Grown Carbon Fiber, Etc.)

The component (A) for use in the present invention may preferably contain a vapor grown carbon fiber and/or a carbon nanotube in an amount of 0.1 to 50 mass %. This content may be more preferably from 0.1 to 45 mass %, still more preferably from 0.2 to 40 mass %. If the content is less than 0.1 mass %, an effect of enhancing the electrical conductivity can be hardly obtained, whereas if the content exceeds 50 mass %, moldability tends to worsen.

Furthermore, the vapor grown carbon fiber or carbon nanotube may preferably contain boron in an amount of 0.05 to 5 mass %, more preferably from 0.06 to 4 mass %, still more preferably from 0.06 to 3 mass %. If the boron content is less than 0.05 mass %, the electrical conductivity-enhancing effect by the addition of boron is small, whereas if boron added in excess of 5 mass %, the impurity amount may increase and this tends to readily cause deterioration in other physical properties.

(Vapor Grown Carbon Fiber)

The vapor grown carbon fiber is a carbon fiber having a fiber length of about 0.5 to 10 μm and a fiber diameter of 200 nm or less, which is obtained, for example, by using, as a raw material, an organic compound such as benzene, toluene, natural gas and hydrocarbon-based gas, and performing a thermal decomposition reaction at 800 to 1,300° C. together with hydrogen gas in the presence of a transition metal catalyst such as ferrocene. The size of the fiber diameter may be preferably 160 nm or less, more preferably 120 nm or less. A size exceeding 200 nm may be not preferred because the effect of obtaining high electrical conductivity decreases. Furthermore, the fiber may be preferably then graphitized at about 2,300 to 3,200° C., more preferably graphitized together with a graphitization catalyst such as boron, boron carbide, beryllium, aluminum and silicon at about 2,300 to 3,200° C. in an inert gas atmosphere.

(Carbon Nanotube)

As for the carbon nanotube, not only its mechanical strength but also its field emission function and hydrogen storage function are recently taken notice of in industry, and its magnetic function also starts attracting attention. This type of carbon nanotube is also called graphite whisker, filamentous carbon, graphite fiber, extra-fine carbon tube, carbon tube, carbon fibril, carbon microtube, carbon nanofiber or the like and has a fiber diameter of about 0.5 to 100 nm. The carbon nanotube includes a single-layer carbon nanotube where the graphite film constituting the tube comprises a single layer, and a multilayer carbon nanotube where the graphite film comprises multiple layers. In the present invention, either a single-layer carbon nanotube or a multilayer carbon nanotube can be used, but a single-layer carbon nanotube may be preferred, because a composition having higher electrical conductivity and higher mechanical strength tends to be obtained.

The carbon nanotube may be obtained, for example, by producing a carbon nanotube by an arc discharge method, a laser evaporation method, a thermal decomposition method or the like described in Saito and Bando, *Carbon Nanotube no Kiso (Basis of Carbon Nanotube)*, pp. 23-57, Corona Publishing Co., Ltd. (1998), and further purifying it by a hydrothermal method, a centrifugal separation method, an ultrafiltration method, an oxidation method or the like so as to enhance the purity. In order to remove impurities, the carbon nanotube may be more preferably high-temperature treated in an inert gas atmosphere at about 2,300 to 3,200° C., still more preferably high-temperature treated in an inert gas atmosphere at about 2,300 to 3,200° C. together with a graphitization catalyst such as boron, boron carbide, beryllium, aluminum and silicon.

(Average Particle Diameter)

In the present invention, the average particle diameter of the component (A) was measured by a laser diffraction scattering method (using an apparatus, Microtrack HRA, manufactured by Nikkiso Co., Ltd.). As for the measurement conditions, 50 mg of a sample was weighed and added to 50 ml of distilled water, 0.2 ml of an aqueous 2% Triton (surfactant, produced by Wako Pure Chemical Industries, Ltd.) solution was added thereto and after ultrasonic wave dispersion for 3 minutes, the number average particle diameter was measured.

Also, in the measurement of the average fiber length of a carbonaceous fiber contained in the component A, 100 carbon fibers observed using SEM (JSM-5510, manufactured by JEOL Ltd.) were subjected to image analysis of the fiber length, whereby the number average fiber length was determined (the fiber as used herein indicates a fiber having a (length of long axis/length of short axis) ratio of 10 or more).

(Component (B))

The main component (a component accounting for 50 mass % or more) contained in the component (B) (thermoplastic resin composition) for use in the present invention include a thermoplastic resin comprising one species or a combination of a plurality of species selected from an acrylonitrile butadiene styrene copolymer, polystyrene, acrylic resin, polyvinyl chloride, polyimide, a liquid crystal polymer, polyether ether ketone, fluororesin, polyolefin, polyacetal, polyamide, polyethylene terephthalate, polybutylene terephthalate, polycarbonate, polycycloolefin, polyphenylene sulfide, polyethersulfone, polyphenylene oxide and polyphenylenesulfone.

Among these, the main component is preferably a thermoplastic resin comprising one species or a plurality of species selected from polyolefin, fluororesin, polybutylene terephthalate, polyphenylene sulfide, a liquid crystal polymer, polyether ether ketone, polycycloolefin and polyethersulfone each having a melting point of 100° C. or more and also from polycarbonate, polystyrene and polyphenylene oxide each having a glass transition temperature of 100° C. or more.

In particular, for the purpose of enhancing the hydrolysis resistance, it may be preferred to contain a crystalline hydrocarbon-based polymer having a melting point of 100° C. or more, more preferably 110° C. or more, still more preferably 120° C. or more. If the melting point is less than 100° C., the separator tends to creep.

The melting point is not particularly limited in its measurement but may be measured according to JIS K7121 by using a differential scanning calorimeter (DSC7) manufactured by Perkin-Elmer.

Specific examples of the crystalline hydrocarbon-based polymer include polypropylene, polyethylene, polybutene, polymethylpentene and syndiotactic polystyrene.

(Elastomer)

In the present invention, the separator can be made resistant to cracking by incorporating an elastomer into the component (B) in an amount of 0.05 to 30 mass %, preferably from 1 to 30 mass %, more preferably from 5 to 25 mass %. If the elastomer content is less than 0.05 mass %, the impact resistance may not be enhanced, whereas if the content exceeds 30 mass %, insufficient rigidity may result and incur deformation of the flow path or worsening of the gas impermeability.

The elastomer for use in the present invention tends to be easily dispersed in the component (B) when the average particle diameter is 5 µm or less, and by making the average particle diameter smaller than the average particle diameter or the average fiber length of the component (A), electrical conductivity and toughness can be enhanced. The average particle diameter may be preferably 4 µm or less, more preferably 3 µm or less. If the average particle diameter exceeds 5 µm, the separator may be readily broken and electrical conductivity also tends to worsen.

The elastomer for use in the present invention is a polymer having rubbery elasticity in the vicinity of ordinary temperature. The elastomer which can be used is, for example, one species or a combination of two or more species selected from acrylonitrile butadiene rubber, hydrogenated nitrile rubber, styrene butadiene rubber, an ethylene-propylene copolymer, an ethylene-octene copolymer, an ethylene-butene copolymer, a propylene-butene copolymer, ethylene-propylene-diene terpolymerization rubber, ethylene butadiene rubber, fluororubber, isoprene rubber, silicone rubber, acrylic rubber, butadiene rubber, high styrene rubber, chloroprene rubber, urethane rubber, polyether-based special rubber, ethylene tetrafluoride/propylene rubber, epichlorohydrin rubber, norbornene rubber, butyl rubber, a styrene-based thermoplastic elastomer, an olefin-based thermoplastic elastomer, a urethane-based thermoplastic elastomer, a polyester-based thermoplastic elastomer, a polyamide-based thermoplastic elastomer, a 1,2-polybutadiene-based thermoplastic elastomer, a fluorine-based thermoplastic elastomer and soft acrylic resin.

Among these, preferred in view of hydrolysis resistance is one species or a combination of two or more species selected from hydrocarbon-based elastomers, in other words, styrene butadiene rubber, an ethylene-propylene copolymer, an ethylene-octene copolymer, an ethylene-butene copolymer, a propylene-butene copolymer, ethylene-propylene-diene terpolymerization rubber, ethylene butadiene rubber, isoprene rubber, butadiene rubber, a styrene-based thermoplastic elastomer, an olefin-based thermoplastic elastomer and a 1,2-polybutadiene-based thermoplastic elastomer.

Specific examples of the styrene-based thermoplastic elastomer include hydrogenated styrene butadiene rubber, a styrene ethylene-butylene styrene block copolymer, a styrene ethylene-propylene styrene block copolymer, an olefin crystal ethylene-butylene olefin crystal block copolymer, a styrene ethylene-butylene olefin crystal block copolymer, a styrene isoprene styrene block copolymer, and a styrene butadiene styrene block copolymer. Among these, preferred are hydrogenated styrene butadiene rubber, a styrene ethylene-butylene styrene block copolymer and a styrene ethylene-propylene styrene block copolymer.

(Number Average Particle Diameter of Elastomer)

The number average particle diameter of the elastomer component dispersed in the component (B) was determined from 100 particles by preparing an ultrathin slice from the cross section of a liquid-nitrogen-frozen sample by means of an ultramicrotome (ULTRACUT N, manufactured by Reichert Inc.), dyeing it with osmium, observing the particle diameter of the dispersion phase through TEM (JEM-1230, manufactured by JEOL Ltd.), and analyzing the TEM image by an image analyzing system (Luzex, manufactured by Nireco Corp.).

(Additive)

In the thermoplastic resin composition which is the component (B) of the present invention, one or more members of an antioxidant, a halogen scavenger, an ultraviolet absorbent and the like may be previously added, if desired, in the range giving a total amount of 0.01 to 5 parts by weight per 100 parts by weight of the component (B). Furthermore, in the electrically conducting resin composition of the present invention, an additive comprising one species or a combination of two or more species selected from an antioxidant, an ultraviolet absorbent, a lubricant, a reinforcing material (e.g., glass fiber, whisker, organic fiber, carbon fiber), a flame retardant, a surfactant and a surface modifier (e.g., hydrophilicity-imparting agent, water repellency-imparting agent, slidability-imparting agent), may be incorporated in a total amount of 0.01 to 20 mass % for the purpose of improving the hardness, strength, electrical conductivity, moldability, durability, weather resistance, water resistance, surface property and the like.

(Production Process of Electrically Conducting Resin Composition)

The electrically conducting resin composition for use in the present invention is not particularly limited in its production process, but for example, in the production process of the electrically conducting resin composition, respective components described above may be preferably mixed as uniformly as possible by using a kneader generally used in the field of resin, such as roll mill, extruder, kneader and Banbury mixer.

The electrically conducting resin composition for use in the present invention may be, after kneading or mixing, ground or granulated for the purpose of facilitating the supply of the material to the molding machine or mold. For the grinding, a homogenizer, a Wiley grinder, a high-speed rotary grinder (e.g., hammer mill, pin mill, cage mill, blender) or the like may be used, and the grinding may be preferably performed while cooling so as to prevent the material from aggregating with each other. The granulation includes a method of pelletizing the material by using an extruder, a Ruder, a co-kneader or the like, and a method using a pan-type granulator or the like.

(Production Method of Separator)

For producing the separator of the present invention, an electrically conducting resin composition comprising a carbonaceous material and a thermoplastic resin composition is formed into a sheet, and the sheet is heated to the melting temperature, inserted into a mold set to not more than the solidification temperature of the sheet, and then subjected to stamp-molding to obtain the separator.

The thickness of the sheet suitable for high-speed molding may be preferably from 0.05 to 2 mm. The thickness of the sheet may be more preferably from 0.1 to 1.5 mm, still more preferably from 0.1 to 1.0 mm. If the thickness is less than 0.05 mm, the separator may be readily broken, whereas if it exceeds 2 mm, the yield may decrease.

(Shape of Sheet)

As for the shape of the sheet, a continuous sheet or a sheet cut into an appropriate size is fed to the mold. The sheet is heated in the preceding step. The heating of the sheet is not limited in its method, but may be performed, for example, by one or more methods selected from infrared heating, induction heating, warm air heating, hot plate heating and microwave heating. For performing the heating at a high speed, infrared heating and induction heating may be preferred. More preferably, the sheet heated may be fed directly to the mold from the extrusion molding machine.

The processing method of the sheet is selected from a method by an extruder, a method by a combination of an extruder and a mill roll, and a method of feeding a powdery material to the roll. The temperature of the mill roll may be preferably set to not more than the solidification temperature of the sheet.

Also, the performance or accuracy of the separator can be more enhanced by forming the sheet in a multilayer structure comprising two or more layers. In particular, when natural graphite is incorporated into the surface layer of the sheet, flowability and in turn accuracy may be enhanced. Furthermore, when the flexural modulus of the surface layer is set to ½ or less in terms of the ratio to the modulus of the center layer (modulus of surface layer/modulus of center layer), the adhesion on stacking may be enhanced to reduce the contact resistance and therefore, the output density may increase. The modulus may be more preferably ⅓ or less, still more preferably ⅕ or less. If the modulus exceeds ½, the contact resistance when stacked tends to worsen. As for the modulus, the flexural modulus was measured according to JIS K7171 under the conditions of a specimen of 40×10×2 mm, a test speed of 1 mm/min and a support-to-support distance of 30 mm.

(Processing of Sheet)

In the stamping step, the time after the sheet heated to the melting temperature is fed to the mold until the pressure intensification is completed by closing the mold may be preferably 10 seconds or less, more preferably 5 seconds or less, still more preferably 3 seconds or less. If the time exceeds 10 seconds, the heated sheet may be solidified. The stamp-molding is performed by holding the pressure for 5 seconds or less, and the molded article is taken out from the mold, whereby a corrugated separator shown in FIG. 2 can be obtained.

The mold temperature is set to not more than the solidification temperature of the material, but for more enhancing the transferability or accuracy, the mold temperature may be preferably controlled by a system capable of elevating or lowering the temperature.

(Gas Seal Part)

The gas seal part may be preferably formed of an insulating resin composition having a compressive permanent strain of 80% or less (in accordance with JIS K6301, test conditions: 70° C., 25% compressive strain, 500 hours), because the gas seal part can be sealed by only clamping a stack. The seal part may be more preferably welded.

As for the welding method of the gas seal part, an ultrasonic wave, a laser and a high-frequency wave may be preferably used, because welding can be topically performed and deformation of the separator can be avoided. In the case of using an ultrasonic wave, welding can be performed by contacting an ultrasonic horn in a pressure-applied state with the welding site assigned to a triangular protrusion which becomes an energy director. In the case of using a laser, a high-output semiconductor laser or a YAG laser may be preferred, and welding can be performed by forming the insulating part from a laser-transmitting composition and irradiating the laser while applying a pressure to the site to be welded. In addition, the seal part may also be joined by a heat-seal method or with an adhesive.

EXAMPLES

The present invention is described in greater detail below by referring to Examples, but the present invention is not limited to these Examples.

Example 1

As the carbonaceous material, a non-needle coke, MC Coke, produced by MC Carbon K.K. was coarsely ground to a size of 2 to 3 mm by a pulverizer (manufactured by Hosokawamicron Corp.), and the coarsely ground product was finely ground by a jet mill (IDS2UR, manufactured by Nippon Pneumatic Mfg. Co., Ltd.) and then adjusted to a desired particle diameter by classification. The particle of 5 µm or less was removed by air classification using a turbo-classifier (TC15N, manufactured by Nisshin Engineering Inc.). Subsequently, 0.15 kg of boron carbide ($B_4C$) was added to a part (14.85 kg) of the finely ground product after the adjustment above and mixed in a Henschel mixer at 800 rpm for 5 minutes, and 1 kg of the mixture was sealed into a 1.5 liter-volume graphite crucible with a cover. The crucible was then placed in a graphitizing furnace with a graphite heater and after the inside of the furnace was once vacuumized and replaced with an argon gas, the powder was graphitized at an inner pressure of 1.2 atm and a temperature of 2,800° C. under a stream of argon gas atmosphere. The powder was further left standing to cool in an argon gas atmosphere and then taken out to obtain 0.94 kg of Graphite Fine Powder (A1). The average particle diameter of the obtained graphite fine powder was 20 μm.

Thereafter, 85 mass % of Graphite Fine Powder (A1), 14.3 mass % of polypropylene (PP; SunAllomer (registered trademark) PX201N, produced by SunAllomer Ltd.) and 0.7 mass % of hydrogenated styrene butadiene rubber (H-SBR; Dynaron (registered trademark) 1320P, produced by JSR Corp.) were kneaded in a pressure kneader (MIX-LABO, manufactured by Moriyama Co., Ltd.) at a temperature of 200° C. and 40 rpm for 5 minutes to obtain Graphite Resin Composition (C1).

The number average particle diameter of H-SBR dispersed in PP was observed by TEM (JEM-1230, manufactured by JEOL Ltd.) and found to be 0.08 μm.

The obtained graphite resin composition was formed into a sheet having a width of 60 mm and a thickness of 3 mm at a molding temperature of 210° C. by using a φ40 single-screw extruder (manufactured by Tanabe Plastics Machinery Co., Ltd.). Furthermore, the sheet heated at 210° C. was sent to a mill roll at 100° C. and rolled to obtain a sheet having a width of 100 mm and a thickness of 1 mm.

The 1 mm-thick sheet was uniformly heated to 240° C. by a halogen lamp (manufactured by Iwasaki Electric Co., Ltd.), and the sheet was further fed in 2 seconds between mold shells at 95° C. disposed in a 50-t press molding machine and stamped under a pressure of output 80% for 3 seconds to obtain a corrugated separator. FIG. 6 shows the cross-sectional shape of the flow path in the obtained separator. The recess of the flow path part had a curved shape and in the projection, a flat part was ensured and the offset of the flat part was 0.3 mm. The separator shape was such that the area was 65×65 mm, the groove width was 1 mm, the groove depth was 0.5 mm, and the flow path on one surface was a serpentine flow path. FIG. 7 shows the overall view. Also, the density was 1.83 g/cm$^3$, the wall thickness in the thinnest part of the flow path was 0.3 mm, the maximum wall thickness/minimum wall thickness ratio was 1.4, and the contact resistance with carbon paper (TGP-H-060, produced by Toray Industries, Inc.) was 6 mΩcm$^2$.

Comparative Example 1

Using the same graphite resin composition as that in Example 1, a sheet having a width of 60 mm and a thickness of 3 mm was extrusion molded at a molding temperature of 210° C. in the same manner. The sheet heated at 210° C. was sent to a mill roll at 100° C. and rolled to obtain a sheet having a width of 100 mm and a thickness of 1.5 mm.

Figure 8:
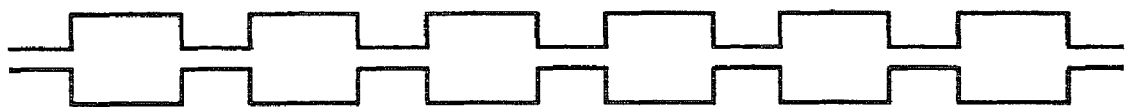
FIG. 8 is a schematic cross-sectional view showing the separator for a fuel cell obtained in Comparative Examples of the present application.

The 1.5 mm-thick sheet was uniformly heated to 240° C. by a halogen lamp, and the sheet was further fed in 2 seconds between mold shells at 95° C. disposed in a 50-t press molding machine and stamped under a pressure of output 80% for 10 seconds to obtain a separator having a cross-sectional shape shown in FIG. 8 where the flow path was symmetric from front to back. The recess of the flow path part did not have a curved shape and in the projection, a flat part was ensured and the offset of the flat part was 2 mm. The separator shape was similarly to Example 1 such that the area was 65×65 mm, the groove width was 1 mm, the groove depth was 0.5 mm, and the flow path on one surface was a serpentine flow path (FIG. 9). Also, the density was 1.80 g/cm$^3$, the wall thickness in the thinnest part of the flow path was 0.3 mm, the maximum wall thickness/minimum wall thickness ratio was 4.3, and the contact resistance with carbon paper (TGP-H-060, produced by Toray Industries, Inc.) was 7.1 mΩcm$^2$.

Example 2

As the carbonaceous material, a non-needle coke, MC Coke, produced by MC Carbon K.K. was coarsely ground to a size of 2 to 3 mm by a pulverizer (manufactured by Hosokawamicron Corp.), and the coarsely ground product was finely ground by a jet mill (IDS2UR, manufactured by Nippon Pneumatic Mfg. Co., Ltd.) and then adjusted to a desired particle diameter by classification. The particle of 5 μm or less was removed by air classification using a turbo-classifier (TC15N, manufactured by Nisshin Engineering Inc.).

Subsequently, 0.75 kg of vapor grown carbon fiber (hereinafter simply referred to as "VGCF", registered trademark of Showa Denko K.K.) and 0.15 kg of boron carbide (B$_4$C) were added to a part (14.1 kg) of the finely ground product after the adjustment above and mixed in a Henschel mixer at 800 rpm for 5 minutes, and 1 kg of the mixture was sealed into a 1.5 liter-volume graphite crucible with a cover. The crucible was then placed in a graphitizing furnace with a graphite heater and after the inside of the furnace was once vacuumized and replaced with an argon gas, the powder was graphitized at an inner pressure of 1.2 atm and a temperature of 2,800° C. under a stream of argon gas atmosphere. The powder was further left standing to cool in an argon gas atmosphere and then taken out to obtain 0.94 kg of Graphite Fine Powder (A2)

Thereafter, Graphite Resin Composition (C2) was produced by kneading Graphite Fine Powder (A2) together with the polypropylene and hydrogenated styrene butadiene rubber used in Example 1 at the same compositional ratio, and the composition was further formed into a sheet and stamp-molded under the same conditions as in Example 1 to obtain a separator having the same corrugated shape as in Example 1. In the obtained separator, the density was 1.82 g/cm$^3$, the wall thickness in the thinnest part of the flow path was 0.3 mm, the maximum wall thickness/minimum wall thickness ratio was 1.4, and the contact resistance with carbon paper (TGP-H-060, produced by Toray Industries, Inc.) was 5.4 mfcm$^2$.

Comparative Example 2

The same graphite resin composition as that in Example 2 was formed into a sheet and stamp-molded in the same manner as in Comparative Example 1 to obtain a separator having the same shape as that in Comparative Example 1. In the obtained separator, the density was 1.81 g/cm$^3$, the wall thickness in the thinnest part of the flow path was 0.3 mm, the maximum wall thickness/minimum wall thickness ratio was 4.3, and the contact resistance with carbon paper (TGP-H-060, produced by Toray Industries, Inc.) was 6.8 mΩ2 cm$^2$.

Example 3

As the carbonaceous material, 14.85 kg of natural graphite (high-purity natural graphite ACP, produced by Nippon Graphite Industries, Ltd., average particle diameter: 24 μm) and 0.15 kg of boron carbide (B$_4$C) were added and mixed in a Henschel mixer at 800 rpm for 5 minutes. Subsequently, 1 kg of the mixture was sealed into a 1.5 liter-volume graphite crucible with a cover, the crucible was then placed in a graphitizing furnace with a graphite heater and after the inside of the furnace was once vacuumized and replaced with an argon gas, the powder was graphitized at an inner pressure of 1.2 atm and a temperature of 2,800° C. under a stream of argon gas atmosphere. The powder was further left standing to cool in an argon gas atmosphere and then taken out to obtain 0.93 kg of Graphite Fine Powder (A3).

Thereafter, 50 mass % of Graphite Fine Powder (A1) produced in Example 1, 35 mass % of Graphite Fine Powder (A3, natural graphite), 13.2 mass % of polypropylene (SunAllomer (registered trademark) PC630A, produced by SunAllomer Ltd.) and 1.8 mass % of propylene α-olefin copolymer (Tafiner (registered trademark) XM-7080, produced by Mitsui Chemicals, Inc.) were kneaded in a pressure kneader (MIX-LABO, manufactured by Moriyama Co., Ltd.) at a temperature of 200° C. and 40 rpm for 5 minutes to obtain Graphite Resin Composition (C3). Subsequently, Graphite Resin Composition (C3) was formed into a sheet having a width of 60 mm and a thickness of 3 mm at a molding temperature of 210° C. by using a 440 single-screw extruder, and the sheet heated was sent to a mill roll at 100° C. and rolled to obtain a sheet having a width of 60 mm and a thickness of 0.1 mm. Furthermore, the sheet having a width of 60 mm and a thickness of 3 mm of Graphite Resin Composition (C1) extrusion-molded in Example 1 was sandwiched by the sheet of Graphite Resin Composition (C3) above, and the sheet assembly was roll-molded to obtain a three-layer sheet having a width of 100 mm and a thickness of 1 mm (structure (layer thickness): C3 (0.03 mmt)/C1 (0.94 mmt)/C3 (0.03 mmt)).

This three-layer sheet was uniformly heated to 240° C. by a halogen lamp, and the sheet was further fed in 2 seconds between mold shells at 95° C. disposed in a 50-t press molding machine and stamped under a pressure of output 80% for 3 seconds to obtain a separator having the same corrugated shape as in Example 1. In the separator obtained, the density was 1.83 g/cm³, the wall thickness in the thinnest part of the flow path was 0.3 mm, the maximum wall thickness/minimum wall thickness ratio was 1.4, and the contact resistance with carbon paper (TGP-H-060, produced by Toray Industries, Inc.) was 5.4 mΩ·cm². Also, Graphite Resin Composition (C1) as the center layer had a flexural modulus of 8,500 MPa and a melting point of 165° C., and Graphite Resin Composition (C3) as the outer layer had a flexural modulus of 6,200 MPa and a melting point of 128° C.

Figure 10:
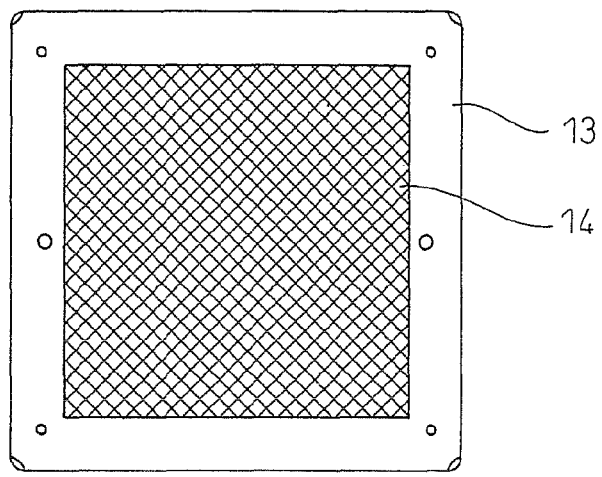
FIG. 10 is a schematic view showing the MEA used in the present invention.

Furthermore, in order to perform a single cell test, an MEA weldable with this separator was prepared as follows. An MEA of 50×50 mm was inserted into a mold, and Insulating Thermoplastic Resin Composition (D1) shown in Table 1 was injected to obtain an MEA integrated with an insulating frame body shown in FIG. 10. In the MEA used, Nafion (registered trademark) 112 (produced by Du Pont) was used for the ion exchange membrane, and a platinum catalyst (TEC10V50E, produced by Tanaka Kikinzoku K.K.) was joined by Pt junction to the anode and the cathode each in an amount of about 0.5 mg/cm² to provide a power generation part area of 25 cm² (50×50 mm). By using Teflon (registered trademark)-treated carbon paper (TGP-H-060, produced by Toray Industries, Ltd. for the gas diffusing electrode, a five-layer structure was fabricated, a five-layer structure where a catalyst was carried (not shown) on the surface of a solid polymer electrolyte membrane (ion exchange membrane), the membrane was sandwiched by carbon paper acting as the gas diffusing layer (electrode), and the outer circumference was covered with an insulating thermoplastic resin composition.

TABLE 1

| | D1 | |
|---|---|---|
| SEEPS *1 | 30 | (Septon 4055, produced by Kuraray) |
| Polypropylene | 34 | (PM801A, produced by SunAllomer) |
| Process oil | 36 | (PW150, produced by Idemitsu Kosan) |

*1 Polystyrene-poly(ethylene-ethylene/propylene) block-polystyrene

This MEA was sandwiched by the separator produced in Example 3 such that the serpentine flow path came into contact with the MEA, and heat-sealed at 135° C. under a pressure of 5 MPa for 10 seconds to produce a single cell unit. Since the sandwiched assembly was integrated by heat sealing, a gasket was not used and the number of parts could be decreased.

Comparative Example 3

Graphite Resin Composition (C1) was formed into a sheet having a width of 60 mm and a thickness of 3 mm, Graphite Resin Composition (C3) was formed into a sheet having a width of 60 mm and a thickness of 0.1 mm, and after sandwiching the sheet to give a construction of C3/C1/C3, the sheet assembly was roll-molded to obtain a three-layer sheet having a width of 100 mm and a thickness of 1 mm (structure (layer thickness): C3 (0.03 mmt)/C1 (0.94 mmt)/C3 (0.03 mmt)). This sheet having a three-layer structure was uniformly heated to 240° C. by a halogen lamp, and the sheet was further fed in 2 seconds between mold shells at 95° C. disposed in a 50-t press molding machine and stamped under a pressure of output 80% for 3 seconds to obtain a separator having the same shape as that in Comparative Example 1. In the separator obtained, the density was 1.82 g/cm³, the wall thickness in the thinnest part of the flow path was 0.3 mm, the maximum wall thickness/minimum wall thickness ratio was 4.3, and the contact resistance with carbon paper (TGP-H-060, produced by Toray Industries, Inc.) was 7 mΩcm². Also, Graphite Resin Composition (C1) as the center layer had a flexural modulus of 8,500 MPa and a melting point of 165° C., and Graphite Resin Composition (C3) as the outer layer had a flexural modulus of 6,200 MPa and a melting point of 128° C.

Subsequently, the five-layer structure MEA produced in Example 3 with the outer circumference being an insulating thermoplastic resin composition was sandwiched by two sheets of the separator prepared above such that the serpentine flow path came into contact with the MEA, and heat sealing of the sandwiched assembly was tried at 135° C. under a pressure of 5 MPa for 30 seconds, but a welding failure was brought about, despite heat sealing for a longer time than that in Example 3. Furthermore, heat sealing was tried at 150° C. under a pressure of 5 MPa for 30 seconds, as a result, a single cell unit could be obtained, though the flow path part of the separator was slightly deformed.

(Evaluation of Single Cell)

The evaluation of a single cell was performed using the separators obtained in Examples 1 and 2 and Comparative Examples 1 and 2 and the single cell units obtained in Example 3 and Comparative Example 3. In the evaluation, an MEA where Nafion (registered trademark) 112 (produced by Du Pont) was used for the ion exchange membrane and a platinum catalyst (TEC10V50E, produced by Tanaka Kikinzoku K.K.) was joined by Pt junction to the anode and the cathode each in an amount of about 0.5 mg/cm² to provide a power generation part area of 25 cm² (50×50 mm), was used.

For the gas diffusing electrode, Teflon (registered trademark)-treated carbon paper (TGP-H-060, produced by Toray Industries, Ltd.) was used.

The power generation test was performed under the conditions of a cell temperature of 80° C., an anode dew point of 80° C., a cathode dew point of 70° C., a hydrogen flow rate of 500 ml/min, an air flow rate of 2,080 ml/min constant, and open-to-air on the outlet side. The temperature of the cell was controlled by attaching a rubber heater.

Figure 11:
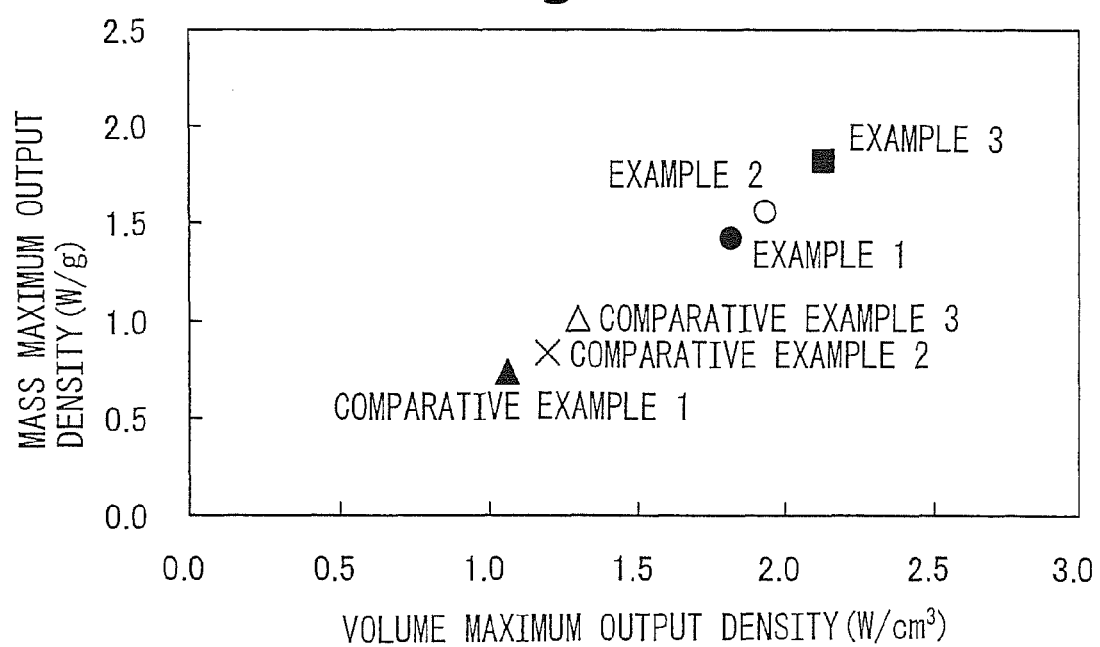
FIG. 11 is a view showing the output test results of a single cell, using the single cell unit obtained in Examples and Comparative Example 3 of the present application.
Figure 12:
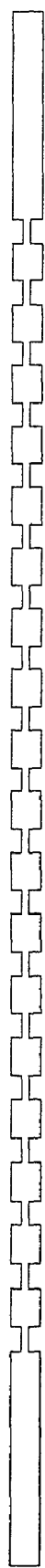
FIG. 12 is a schematic cross-sectional view showing the fuel cell separator where a conventional flow path is provided symmetrically from front to back.

FIG. 11 shows the output test results. Regarding Examples 1 and 2 and Comparative Examples 1 and 2, the unit volume and unit mass were calculated respectively from the volume and mass of a single cell comprising a separator (two sheets), an MEA (one sheet), a gasket (two sheets) and a carbon paper (two sheets). Regarding Example 3 and Comparative Example 3, the unit volume and unit mass were calculated from the volume and mass of the produced single cell unit. Accordingly, the results shown in FIG. 11 are the results compared by excluding the volume and mass of the metal plate or current collector plate sandwiching the single cell from both sides.

As can be seen from FIG. 11, when the corrugated separator formed of a carbon material was used, the thickness of the separator could be reduced, a thin stack could be fabricated and the weight could be more decreased, so that the maximum output density could be greatly enhanced. In particular, by adding a small amount of VGCF, the output density could be more enhanced.

Also, when as in Example 3, a corrugated separator was used and a single cell was produced by welding, the contact resistance with the MEA could be reduced, the output density could be more enhanced by virtue of not using a gasket, and use of the unitized cell could shorten the fabrication time to $\frac{1}{5}$ the time of Comparative Example 1.

After the power generation test, the single cell or single cell unit was disassembled and the flow path of the separator was observed, as a result, many water drops tended to remain in Comparative Examples 1 to 3 as compared with Examples 1 to 3.

The invention claimed is:

1. A separator for a fuel cell, comprising an electrically conducting resin composition, and comprising an electrically conducting flow path part; wherein
    the electrically conducting resin composition comprises a carbonaceous material (A) and a thermoplastic resin composition (B) at a mass ratio (A)/(B) of 1 to 20 with a total mass of (A) and (B) accounting for 80 to 100 mass % in the composition;
    the electrically conducting flow path part has a corrugated shape having a recess and a projection on each of front and back surfaces thereof, where the recess constitutes a groove for a flow path;
    the electrically conducting flow path part has a wall thickness of 0.05 to 0.5 mm and a maximum wall thickness of the electrically conducting flow path part is from 1 to 3 times a minimum wall thickness of the electrically conducting flow path part;
    the thermoplastic resin composition (B) comprises from 0.05 to 30 mass % of an elastomer component (C), based on a total mass of the thermoplastic resin composition (B); and
    the average particle diameter of the elastomer component (C) is from 0.01 to 5 gm and is smaller than the average particle diameter or average fiber length of the carbonaceous material (A).

2. The separator for a fuel cell as set forth in claim 1, wherein the thermoplastic resin composition (B) comprises a crystalline hydrocarbon-based polymer having a melting point of 100° C. or more.

3. The separator for a fuel cell as set forth in claim 1, wherein the carbonaceous material (A) comprises from 0.05 to 5 mass % of boron, based on a total mass of the carbonaceous material (A).

4. The separator for a fuel cell as set forth in claim 1, wherein the carbonaceous material (A) comprises from 0.1 to 50 mass %, based on a total mass of the carbonaceous material (A), of at least either one of a vapor grown carbon fiber and a carbon nanotube each having a diameter of 200 nm or less.

5. The separator for a fuel cell as set forth in claim 1, wherein a first electrically conducting resin composition layer having a first composition and a second electrically conducting resin composition layer having a composition different from the first composition are stacked.

6. The separator for a fuel cell as set forth in claim 5, wherein natural graphite is contained in either one or both of the first electrically conducting resin composition layer and the second electrically conducting resin composition layer.

7. The separator for a fuel cell as set forth in claim 5, wherein the separator has a multilayer structure with the first electrically conducting resin composition layer being a center layer and the second electrically conducting resin composition layer being an outer layer and a flexural modulus of the second electrically conducting resin composition layer is $\frac{1}{2}$ or less of a flexural modulus of the first electrically conducting resin composition layer.

8. The separator for a fuel cell as set forth in claim 7, wherein a melting point of the second electrically conducting resin composition layer is lower than a melting point of the first electrically conducting resin composition layer.

9. The separator for a fuel cell as set forth in claim 1, wherein the contact resistance of a membrane electrode assembly with a gas diffusing layer is 30 m$\Omega$cm$^2$ or less under the pressure condition of 2 MPa.

10. The separator for a fuel cell as set forth in claim 1, wherein the density of the flow path part is from 1.2 to 2.5 g/cm$^3$.

11. The separator for a fuel cell as set forth in claim 1, wherein the recess of the flow path part has a curved shape in the cross section and the projection has a flat surface.

12. The separator for a fuel cell as set forth in claim 1, wherein in the cross section of the flow path part, an offset allowing flat surfaces of the projections to overlap by from 0.05 to 0.5 mm between front and back surfaces is provided.

13. The separator for a fuel cell as set forth in claim 1, wherein the thermoplastic resin composition (B) comprises a component having a glass transition temperature of −20° C. or less.

* * * * *